O. NICOLAI.
METHOD OF DRYING MILK.
APPLICATION FILED JAN. 31, 1912.
1,063,581.
Patented June 3, 1913.
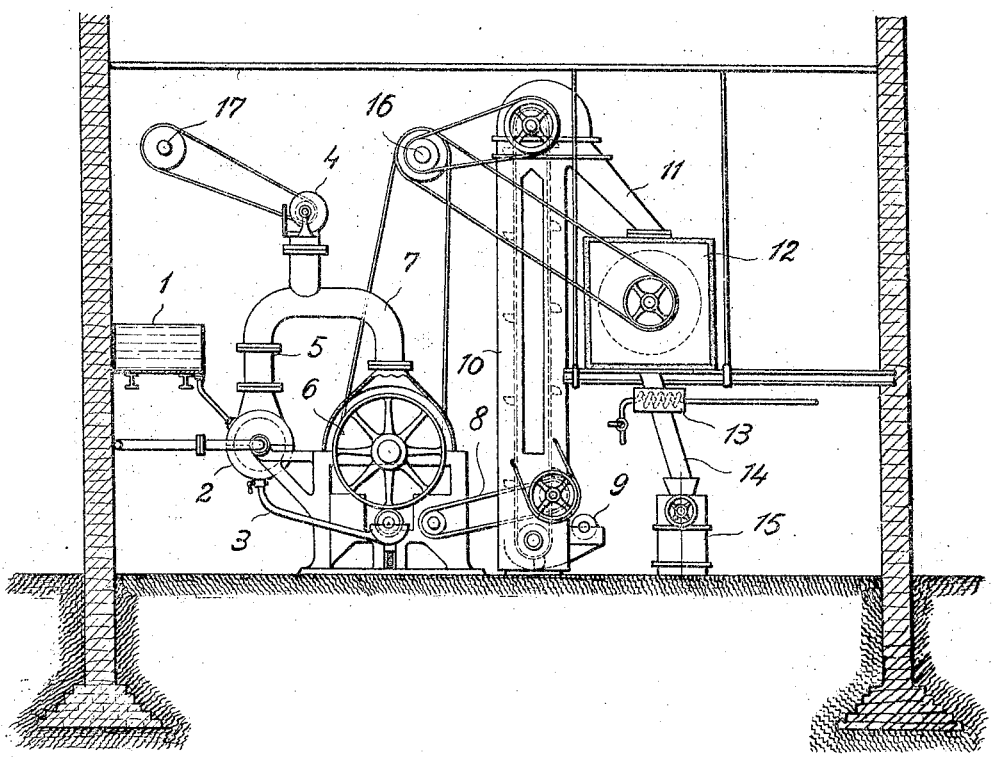

though the constituents of the milk would fairly support such a pause of from 8 to 10%, yet this period is purposely kept a rather short one, since the milk skin, in spite of being of the thickness of paper only, still contains all the bacteria which have developed during the former stages of the process and which would rapidly increase in number if the temperature favorable to them were maintained any longer. Therefore the temperature in the third stage is chosen so as to furthermore prevent the increase of these bacteria.

UNITED STATES PATENT OFFICE.

OSCAR NICOLAI, OF VIERSEN, GERMANY.

METHOD OF DRYING MILK.

1,063,581.  Specification of Letters Patent.  Patented June 3, 1913.

Application filed January 31, 1912. Serial No. 674,482.

*To all whom it may concern:*

Be it known that I, OSCAR NICOLAI, a citizen of the Empire of Germany, residing at Viersen, in the Empire of Germany, have invented a new and useful Method of Drying Milk, of which the following is a specification.

My invention relates to a method of so drying milk, that after having been stored for a longer period the dried milk can be dissolved in water and will furnish an emulsion equal to milk in its natural state.

I will now proceed to describe my invention with reference to the accompanying drawing, which diagrammatically represents a vertical longitudinal section through a building and shows the several apparatus in elevation.

For attaining the object indicated above it is essential that the milk be not altered by the drying process as regards its physical and chemical properties. This can be effected only in the manner, that during the evaporation and drying of the milk certain different temperatures be maintained and allowed to severally act upon the milk only for certain periods. At temperatures between 40° and 60° centigrade no disadvantageous alteration of the constituents of the milk takes place, it is true, however the product obtained by drying at this temperature will after a short time show a disagreeable taste and smell. Such a product may be perfectly free from germs in spite of its altered taste, however, it has undergone special alterations which have not been cleared up yet.

According to my invention a product stable for a long time can be obtained by dividing the drying operation into four stages and maintaining a certain temperature for each stage during a certain period, the various stages closely following one after the other and forming a single coherent process.
In the first stage of the process a temperature of from 60 to 80° centigrade is maintained for about from half an hour to one hour, so as to bring the milk into such a state, that its specific weight at the said temperature amounts to about from 5 to 10 degrees Baumé. In the second stage the milk obtained in the first stage is turned into a skin as thin as paper by exposing the milk in a quite thin layer for about from 10 to 20 seconds to the action of a temperature of about from 90° to 100° centigrade. In the third stage the milk skin as thin as paper is first cooled and then exposed for about half an hour to the action of a temperature of from 60° to 80° centigrade. In the fourth stage the milk heated up to from 60° to 80° centigrade is rapidly cooled.

*First stage.*—The temperature and the duration mentioned above prevent the formation of injurious bacteria in the milk during the evaporation, whereas such bacteria might be easily formed at temperatures of from 40° to 50° centigrade, for example by drying *in vacuo*. The said temperature and duration also prevent disadvantageous alterations of the constituents of the milk.

For carrying into effect the first stage of the process an evaporating apparatus of any approved construction is employed, for example one marked 2 in the drawing, which will be referred to later on.

*Second stage.*—Temperatures of from 90 to 100° centigrade would prove injurious to the product, if they were permitted to act upon the milk for a longer time. For this reason the duration of the exposition of the milk to these temperatures is limited to from 10 to 20 seconds, as mentioned above. During this short period the temperature should also never exceed 100° centigrade, since otherwise detrimental alterations of the milk constituents would take place.

For carrying into effect the second stage of the process a drying apparatus of any approved construction, for example a cylinder drying machine, is employed, such as is marked 6 in the drawing and to be referred to later on.

*Third stage.*—Between the second and third stages a certain pause is to be left. The milk skin obtained in the second stage still contains about from 8 to 10% of moisture. Such a product would, when stored, change its taste in a short time. The mentioned percentage of moisture must, however, be maintained so as to permit the milk sugar contained in the milk to crystallize. Otherwise a deformation of the milk constituents would be produced. Although a certain pause is left between the second and third stages, yet the latter is made to closely follow the former. The purpose of the third period is to remove the superfluous moisture from the milk excepting the water of crystallization of the milk sugar and to form a product perfectly free from germs.

For carrying into effect the third stage a suitable drying apparatus of any approved construction is employed, for example one marked 12 in the drawing and to be referred to later on.

*Fourth stage.*—The dried milk possessing a temperature of about from 60° to 80° centigrade requires to be cooled to ordinary temperature and also to be reduced in shape, in other words to be turned into an article of commerce.

For carrying into effect the fourth stage of the process a cooling apparatus and a reducing or breaking or grinding or pulverizing machine of any approved construction are employed. Such machines will be hereinafter referred to.

In the drawing 1 denotes a reservoir of any known construction, in which the milk to be dried is stored up.

The evaporating apparatus 2 may comprise a semicircular trough below, a semicircular hood above, a horizontal central hollow shaft mounted in brackets 3 to turn and carrying a number of parallel hollow heating bodies similar in shape to lenses, and means for supplying steam or other heating medium to the hollow shaft. The trough may be connected with the reservoir 1 by means of tubes and stop valves (not shown) or the like, so that the trough can be charged with fresh milk from the reservoir 1. Thermometers and other known instruments should be provided for measuring the temperature and watching the operation. The hollow bodies on the shaft heated by steam or the like partly dip in the milk and constantly rotate, so that by the contact with the hot walls of the heating bodies the milk is gradually evaporated and thickened to a certain degree, so as to comply with the conditions mentioned above.

A ventilator or exhauster 4 shown to be connected with the hood of the evaporating apparatus 2 by means of a tube 5 serves for discharging the steam developed from the milk into the atmosphere or somewhere else. By means of the ventilator or exhauster 4 a current of hot or cold air can be set up.

The cylinder drying machine 6 may comprise two superposed hollow cylinders of different diameter, a trough beneath the lower small cylinder, a hood inclosing about two thirds of the upper large cylinder and connected with the ventilator or exhauster 4 by means of a tube 7, and means for supplying steam or other heating medium to the two cylinders. The troughs of both the evaporating apparatus 2 and the cylinder drying machine 6 may be connected together by means of tubes and stop valves (not shown) or the like, so that from time to time the thickened milk can be discharged from the trough of the evaporating apparatus 2 to that of the drying machine 6. The lower small cylinder in the latter is vertically adjustable and mostly dips in the thickened milk in the trough, so that during its rotation it is adapted to apply a quite thin layer of milk to the periphery of the upper large cylinder. This layer of milk is further dried by means of the steam or other heating medium. The ventilator or exhauster 4 produces a current of hot or cold air for carrying off the steam developed from the layer of milk on the large cylinder. Thermometers and other instruments are provided for controlling the second stage of the method. Some known devices, such as a scraper or the like, may be employed for scraping the mostly dried milk, that is a thin milk skin, off the large cylinder, and an endless apron 8 of any approved construction may be employed for receiving the scraped off mostly dried milk and delivering it up to some known conveyer 9, that is an endless screw working in an open channel. Of course other apparatus may be employed for conveying the mostly dried milk. An elevator 10 is shown to be disposed for receiving the mostly dried milk from the conveyer 9, elevating and discharging the milk through a chute 11 to the drying apparatus 12. Obviously the path from the cylinder drying machine 6 over the endless apron 8 and through the conveyer 9, the elevator 10 and the chute 11 to the drying apparatus 12 means a pause between the second and third stages, as mentioned above.

The drying apparatus 12 may comprise a long rectangular casing, one or several round or angular drums mounted therein to turn and means for sending a current of hot air through the drums, also means for regulating the temperature in the apparatus. The mostly dried milk enters one drum at one end and is kept moving or rolling during the rotation of the drum, while being completely dried up by the current of hot air. Thermometers and other instruments are provided for watching the operation of the drying apparatus 12. The completely dried hot milk leaving the one drum or several drums is discharged into a conveyer 13 working in a channel cooled from without by means of cold water, so that the dried milk is thereby cooled. The cooled dried milk is discharged from the conveyer 13 through a tube or chute 14 into a reducing or sifting machine 15, which may comprise a hopper, a brushing roller and a sieve. During the rotation of this roller the milk may be reduced or broken and driven through the holes of the sieve. The product so obtained can be packed for sale. Of course any other machine may be employed for grinding or otherwise finishing the dried milk, as may be preferred.

16 and 17 denote shafts for driving the several apparatus by means of pulleys and endless belts (not shown).

I claim:

1. Method of treating milk which consists in heating the milk so as to thicken the same, spreading the thickened milk in a thin stratum, heating said stratum to a higher degree for a short period to form a skin, cooling the skin, reheating the same to expel the moisture, and cooling the dephlegmated skin.

2. The method of drying milk consisting in exposing the milk for from half an hour to one hour to the action of a temperature of about 65 to 85° centigrade so as to thicken the milk up to about 6 to 9° Baumé, immediately afterward exposing the milk in a thin layer for a few seconds to the action of a temperature of about 90° to 100° centigrade, so as to turn the milk into a wet milk skin as thin as paper, thereupon cooling the mostly dried milk, exposing it for half an hour to the action of a temperature of about 65° to 85° centigrade, so as to free it from water excepting the water of crystallization of the milk sugar, and cooling the completely dried milk.

OSCAR NICOLAI. [L. S.]

Witnesses:
HELEN NUFER,
WILHELM SONNOCK.